July 18, 1939. H. Z. GORA 2,166,402
COUPLING
Filed May 3, 1937 2 Sheets-Sheet 1
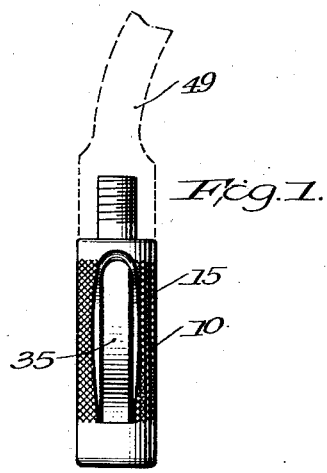
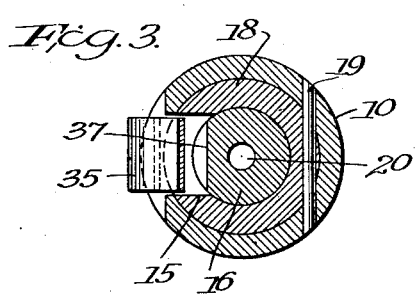
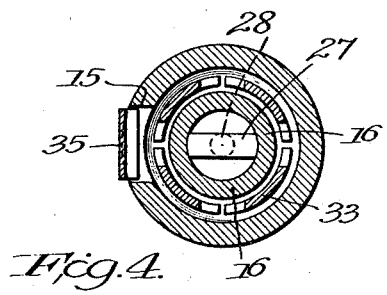
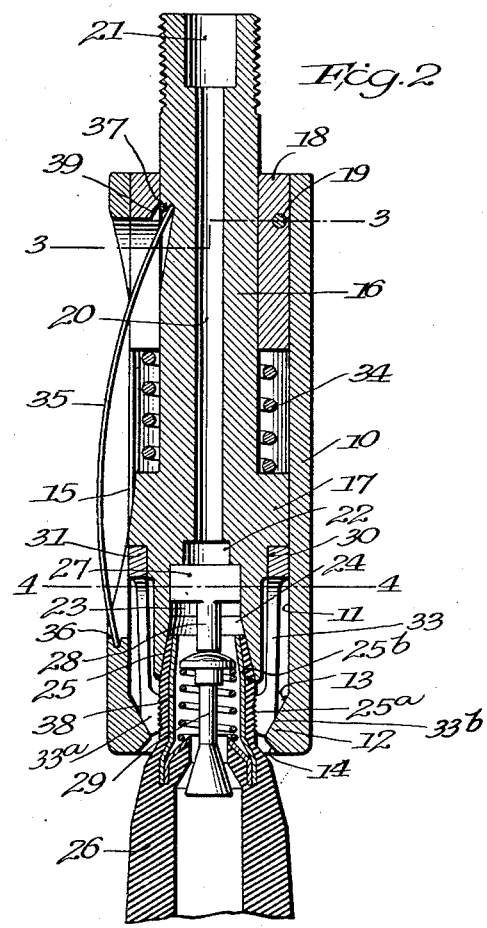
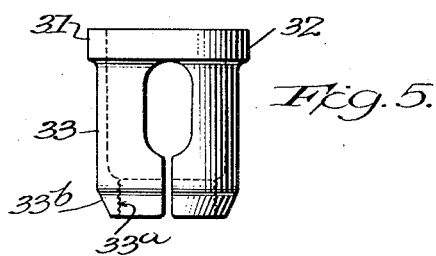
Inventor
Henry Z. Gora
Attorneys July 18, 1939. H. Z. GORA 2,166,402
COUPLING
Filed May 3, 1937 2 Sheets-Sheet 2
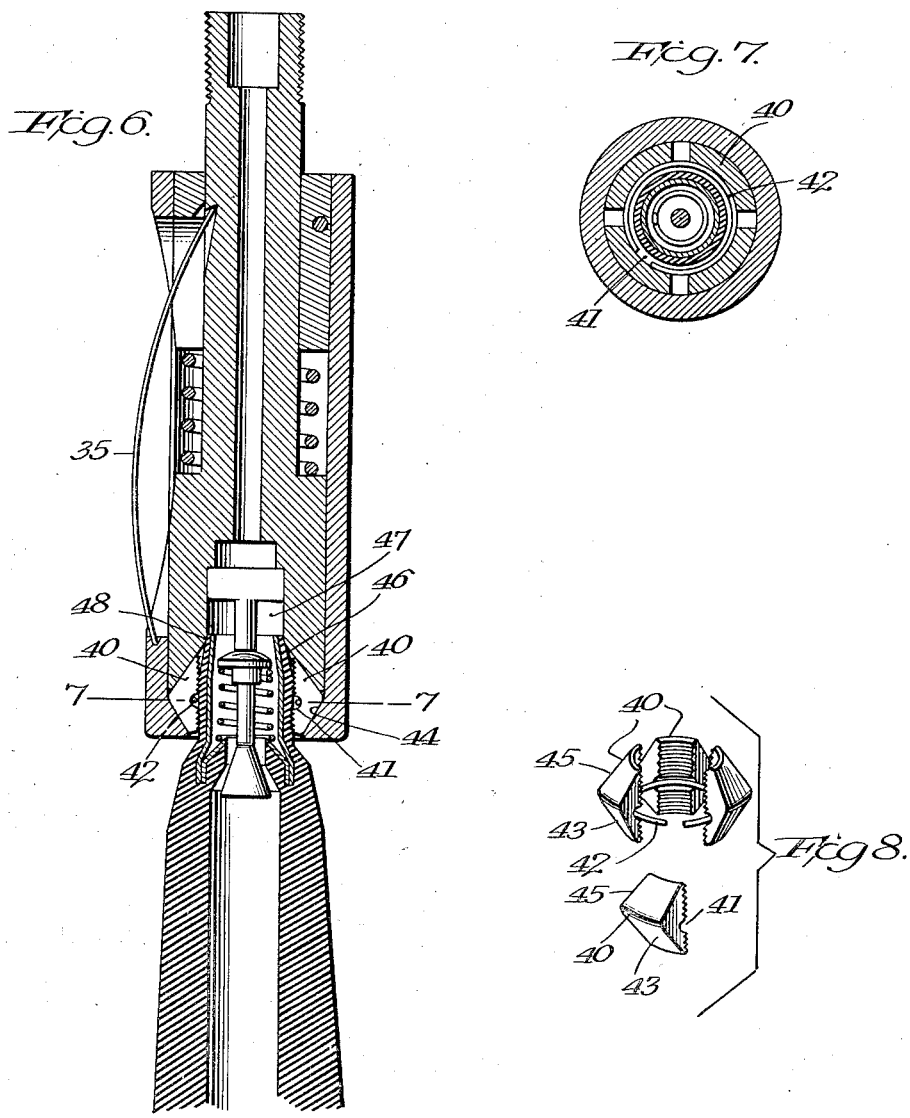
Inventor.
Henry Z. Gora
Attorneys Patented July 18, 1939

2,166,402

UNITED STATES PATENT OFFICE 2,166,402

COUPLING

Henry Z. Gora, Bridgeport, Conn., assignor to Jenkins Bros., Bridgeport, Conn., a corporation of New Jersey Application May 3, 1937, Serial No. 140,524

4 Claims. (Cl. 285—169)

The present invention relates to couplings and in particular to couplings utilizable for the purpose of connecting an airline with the inflating stem of the tube of a vehicle tire. The new coupling is particularly advantageous in its application to rubber valve stems and the illustrative embodiments shown by way of example in the accompanying drawings show the coupling designed for such association. A main purpose of the invention is to provide a coupling which will insure a tight seal and may be most conveniently manipulated.

The various advantages afforded by a coupling constructed in accordance with the invention will be readily understood from the following description with reference to the accompanying drawings in which:

Figure 1 is an elevation of one embodiment of the new coupling.

Figure 2 is an enlarged axial section of the coupling of Figure 1, showing also, in axial section, the tip portion of a rubber valve stem in operative association with the coupling;

Figure 3 is a section substantially on line 3—3 of Figure 2.

Figure 4 is a section substantially on line 4—4 of Figure 2.

Figure 5 is an elevation of a collet which appears in Figures 2 and 4.

Figure 6 is a section similar to that of Figure 2 of a modified form of coupling, the figure also showing, in axial section, the tip portion of a rubber valve stem in operative association with the coupling.

Figure 7 is a section substantially on line 7—7 of Figure 6, and

Figure 8 shows in perspective and partially disassembled a gripping unit which appears also in Figure 6.

Referring to the drawings, and first to Figures 1 to 5, reference numeral 10 designates a barrel provided with an axial bore 11 which at the lower end of the barrel is constricted annularly by a thickened portion 12 which presents an inwardly enlarging conical surface 13 and an outwardly flared surface 14. At one side the barrel is provided with a longitudinally extending slot 15 having parallel edges which may be bevelled off externally as indicated. The slot is closed at both ends.

In the barrel 10 is a plunger 16 which has a cylindrical enlargement 17 slidably guided in the bore 11. The upper or shank portion of the plunger is slidably guided in a collar 18 which fills the space between the shank portion and the walls of the bore 11 and is secured in position by means of a pin 19 which penetrates the barrel and the collar as particularly shown in Figure 3.

The plunger 16 has a through axial bore which is upwardly enlarged if desired at 21 and is downwardly enlarged at 22 and again at 23, terminating in a downwardly enlarging conical socket portion 24 which is designed to receive and make a seal with the tapered or conical rubber tip portion 25 of a rubber valve stem 26.

In the enlargement 23 is pressed a cross piece 27 which carries a downwardly projecting pin 28 which, when the coupling is operatively applied to the stem, as shown in Figure 2, engages and depresses the valve pin 29. It will be evident that the flared surface 14 is useful in guiding the stem tip into the socket 24 wherein, as here shown, it has a circumferential zone of sealing contact of substantial longitudinal extent. In fact, as shown, the external taper of the stem tip is the same as the taper of the socket, although this is not an essential relation. With a more abruptly tapered socket the seal will be adequately made with the extreme edge of the tip and with a less degree of taper the seal can be effected on the line of juncture 25b between the tapered tip extremity and the subjacent cylindrical portion 25a.

Surrounding a reduced portion 30 at the lower portion of the enlargement 17 is the annular portion 31 of a collet 32 of springy metal. The lower portion of the collet is slit longitudinally to provide four arms 33 whose extremities are inwardly thickened to provide gripping means in the form of jaws 33a having inner arcuate faces which are preferably roughened as by circumferential corrugations, as shown. The jaw portions 33a extend below the lower extremity of the plunger 16 and the arms 33 are laterally spaced from the said extremity so as to be flexible inwardly.

The jaw portions 33a in the position of parts shown in Figure 2 are annularly disposed about the surface 13 and have beveled outer surfaces 33b which bear against the said surface.

Interposed between the enlargement 17 and collar 18 is a fairly powerful compression spring 34 which acts to urge the plunger, and therewith the collet, toward the lower end of the barrel so that the series of jaws is cammed into a normal radially contracted relation and will firmly grip the stem tip. As shown in Figure 2 the jaws grip the cylindrical portion 25a of the stem tip throughout a substantial longitudinal extent.

A flat spring 35 has one end engaged in a notch 36 in the lower end wall of slot 15, the other end of spring 35 being engaged in a notch 37 formed in the plunger 16. Spring 35 is bowed outwardly intermediate its ends and its spring action is normally overcome by the force of spring 34. However, when pressure toward the barrel is applied to the intermediate portion of spring 35, the straightening of the spring causes it to lengthen with a very powerful motive effect on the movable abutment or plunger 16 so that the latter is moved outwardly of the barrel and the jaws 33 spreading inwardly thereof, the jaws spreading radially due to their inherent springyness as they ride upwardly on the surface 13. In the expanded relation of the series of jaws the stem tip may be introduced into the socket or released therefrom. Immediately spring 35 is released the jaws assume their normal contracted relation in which the opening through them is of somewhat smaller diameter than the stem tip which they are intended to grip.

The coupling exerts a very powerful grip on the stem tip, and the gripping force due to the circumferential arrangement of the jaws is evenly distributed about the tip circumference so that there will be no localized crushing effect exerted on the tip insert or liner 38, which is of relatively light metal. The collet may be fixed on the reduced portion 30, if desired, by any suitable means. However, it need not be fixed in this position, but may be capable of turning relative to the barrel and plunger. This latter relation is of some advantage in preventing grooving or mutilation of the stem tip when the barrel and plunger are turned relative to the stem. In such case the collet will remain stationary with the stem. The collet will follow the plunger, in any event, in the upward movement of the latter, since the outwardly spring biased jaws 33a acting on the surface 13, tend constantly to move the collet inwardly.

Relative rotation of the plunger and barrel is prevented by the spring 35. Freedom of longitudinal movement of the free end of the spring may be insured by slightly bevelling the lower inner edge of the adjacent end wall of slot 15 as shown at 39, Figure 2.

The arrangement shown in Figures 6 to 8 is substantially the same as that just described with the exception that the socket and gripping means are of modified design. Referring to these figures, there is provided a segmental annular gripping means comprising four jaw portions 40 which are substantially triangular in longitudinal section and have transversely arcuate inner faces provided with small transverse corrugations and with transverse grooves 41 which receive a light split spring ring 42. The lower outer faces 43 of the jaws are spring biased by ring 42 against the conical surface 44 of the barrel and the upper outer faces 45 are engaged in the conical socket portion 46 of the plunger. As in the first embodiment the coil springs acts to move the plunger downwardly relative to the barrel. The surface 46 acts on the surfaces 45 to move the jaws radially inwardly and also has a downward component so that surface 44 acting on the surfaces 43 also tends to cam the jaws radially inwardly. The series of jaws is in normally contracted or gripping relation, as in the first embodiment. When the flat spring is depressed the plunger rises relative to the barrel and permits the series of jaws to ride upwardly under the expanding action of spring 42 to inoperative position on the inclined surface 44.

The surface 46 is surmounted by a coaxial cylindrical surface 47, the two surfaces merging in a circular substantially line edge 48 whose diameter is slightly less than the maximum diameter of the tapered laterally rubber covered tip portion of the stem to be engaged. Consequently, as shown in Figure 6, substantially line sealing contact is made between the socket and the stem tip when the coupling and stem are operatively associated.

In the case of both embodiments the coupling can be applied very quickly and easily and upon release of the flat spring an extremely effective gripping action is secured, it being practically impossible to pull the coupling and stem apart without manipulation of the release mechanism. The barrel is preferably substantially cylindrical and may be of a size such that it can be passed through the usual rim aperture. With this latter relation, the coupling, the hose 49 of Figure 1 being detached, may be applied to the stem and the stem pulled through the rim aperture and held during a tire mounting operation.

The shape of the socket can be modified as desired. Herein couplings for application to the circumferentially rubber covered tips of rubber valve stems are particularly contemplated and hence appropriate sockets for making a side seal have been shown. The jaws, having a gripping zone of considerable longitudinal extent on the cylindrical tip portion of the stem to which the coupling is applied and having a substantially uniform circumferential action, act to positively center the stem and hold it in coaxial relation to the socket so that a uniform circumferential seal is assured. The jaws, as shown, have longitudinal line engagement with the cylindrical tip portion as contrasted to mere point engagement.

The arrangement is preferably such that necessary contraction and expansion of the jaw series occurs with slight longitudinal displacement. The releasing action is thus substantially instantaneous and quick removal of the coupling from the stem can be made so that the stem valve can close without substantial loss of air.

It will be understood that the invention is not limited to the specific form and arrangement of parts shown and that accordingly I do not limit myself except as in the following claims.

I claim:
1. A coupling for application to valve stems, said coupling comprising a barrel, gripping means at one end of the barrel and movable relative to the barrel in one direction to operative position and in the other direction to inoperative position, spring means normally holding said gripping means in operative position, a movable abutment in said barrel for said spring means, and a flat spring normally in bowed relation and having one end seated against said barrel and the other end against said abutment, pressure exerted on said spring to straighten the same causing said abutment to move and thereby overcome the action of said spring means on said gripping means so that in consequence the latter moves to inoperative position.

2. A coupling for application to valve stems, said coupling comprising a barrel, gripping means at one end of the barrel and movable relative to the barrel longitudinally thereof in one direction to operative position and in the other direction to inoperative position, a plunger reciprocable longitudinally of said barrel, spring means urging said plunger in one direction of movement and therethrough urging said gripping means to operative position, and a flat spring extending longitudinally of said barrel and having intermediate its ends a normally outwardly bowed portion accessible for depression toward the barrel, one end of said flat spring being seated against the barrel and the other end thereof being seated against said plunger, depression of said flat spring causing displacement of said plunger against the action of said spring means so that in consequence said gripping means moves to inoperative position.

3. A coupling for application to the circumferentially rubber covered tip of a rubber valve stem, said tip comprising an extreme tapered portion surmounting a substantially cylindrical portion, said coupling comprising means defining an interiorly conical socket portion of a size to receive the tapered portion of the tip and make sealing contact therewith throughout the circumference of said socket portion, and radially contractible and expansible gripping means carried by said coupling operative to grip said cylindrical tip portion substantially throughout the circumference and with an elongated engagement zone longitudinally thereof whereby the coupling is secured to the stem coaxially with said socket portion and uniform sealing contact maintained, there being a passage leading to said socket portion outwardly of the sealing zone.

4. A coupling for application to the circumferentially rubber covered tip portion of a rubber valve stem, said coupling comprising means defining a socket portion of a size to receive said tip portion and make sealing contact therewith throughout the circumference of said socket portion, and means carried by the coupling operative to grip said rubber stem below the sealing zone for the purpose of securing the coupling to the stem and maintaining said sealing contact, there being an air passage leading to said socket portion above said sealing zone.

HENRY Z. GORA.